United States Patent
Kamen

[19]

[11] Patent Number: 5,991,393
[45] Date of Patent: Nov. 23, 1999

[54] METHOD FOR TELEPHONY CALL BLENDING

[75] Inventor: Vladimir Kamen, San Francisco, Calif.

[73] Assignee: Genesys Telecommunicaitons, Laboratories, Inc., San Francisco, Calif.

[21] Appl. No.: 08/964,309

[22] Filed: Nov. 4, 1997

[51] Int. Cl.[6] .............................. H04M 3/00; H04M 7/00
[52] U.S. Cl. ...................... 379/265; 379/266; 379/219
[58] Field of Search ..................... 379/265, 266, 379/309, 34, 88.25, 111, 112, 133, 137, 219, 220, 221, 230

[56] References Cited

U.S. PATENT DOCUMENTS

| | | | |
|---|---|---|---|
| 4,829,563 | 5/1989 | Crockett et al. | 379/309 |
| 4,881,261 | 11/1989 | Oliphant et al. | 379/309 |
| 5,179,589 | 1/1993 | Syu | 379/266 |
| 5,214,688 | 5/1993 | Szlam et al. | 379/265 |
| 5,343,518 | 8/1994 | Kneipp | 379/266 |
| 5,452,350 | 9/1995 | Reynolds et al. | 379/265 |
| 5,467,391 | 11/1995 | Donaghue, Jr. et al. | 379/265 |
| 5,519,773 | 5/1996 | Dumas et al. | 379/309 |
| 5,553,133 | 9/1996 | Perkins | 379/266 |
| 5,621,790 | 4/1997 | Grossman et al. | 379/266 |
| 5,640,445 | 6/1997 | David | 379/266 |

*Primary Examiner*—Scott Wolinsky
*Assistant Examiner*—Benny Q. Tiell
*Attorney, Agent, or Firm*—Donald R. Boys

[57] ABSTRACT

An automated dialer for a call center maximizes agent efficiency in two different ways. In a first method overdial probability is expressed as a probability function of number of agents and total traffic volume; the probability function is set equal to a maximum allowable overdial probability; and the resulting equation is solved for maximum total traffic volume producing the maximum overdial probability. The maximum total traffic volume is then used to determine a new dialing rate by dividing the difference between the calculated maximum traffic volume and known inbound traffic volume by the product of average call length and hit rate, where hit rate is the percentage of connected calls to total dialed outbound calls. In a second method a maximum total traffic volume is calculated from total number of agents times a desired agent utilization factor, and the total traffic volume is used as in the first method to calculate and set a new dialing rate for outbound calls.

14 Claims, 3 Drawing Sheets

Call Blending Algorithm
Definitions $T$ - The offered traffic volume (combined inbound and out bound)

$T_{inb}$ - Inbound traffic volume $T_{out}$ - Outbound traffic volume $M$ - Number of agents in the group $r$ - Agent utilization factor $P_B(M)$ - Probability of having an overdialed call for the qroup of $M$ agents $DR$ - Dialing rate $HR$ - Hit ratio (percentage of the connected calls to the total dials)

$r_d$ - The required agent utilization $Pmax$ - The maximum allowable overdial rate Step 1. Calculating $P_B(M)$ $P_B(0) = 1$ $P_B(M) = TP_B(M-1) / (M + TP_B(M-1)), M > 0$ Step 2. Using gold section method for finding the value of $Tmax$ $P_B(M) = Pmax$ Step 3. For the found value of $Tmax$, we calculate the dialing rate as follows $DR = (Tmax - Tinb) / (E(t_s) HR)$ [ dials/min]

Overdial Rate Goal Value

*Fig. 2*

Call Blending Algorithm
Definitions

$T$ - The offered traffic volume (combined inbound and out bound )

$T_{inb}$ - Inbound traffic volume $T_{out}$ - Outbound traffic volume $M$ - Number of agents in the group $r$ - Agent utilization factor $P_B(M)$ - Probability of having an overdialed call for the qroup of $M$ agents $DR$ - Dialing rate $HR$ - Hit ratio (percentage of the connected calls to the total dials)

$r_d$ - The required agent utilization $P_{max}$ - The maximum allowable overdial rate Calculation of the maximum traffic volume the group can handle Step 1.

$T\,max = Mr_d$

Step 2. For the found value of $T\,max$ we calculate the dialing rate as follows $DR = (T\,max - T_{inb}) \,/\, (E(T_S)\,HR)$ [ dials/min ]

Busy Factor Goal Value

*Fig. 3*

METHOD FOR TELEPHONY CALL BLENDING

FIELD OF THE INVENTION

The present invention is in the field of telephony communication and has particular application to methods including software for blending incoming calls with out-bound calls that result from an automated dial-out system.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventors and to those with skill in the art in general. For this reason, much minute detail of known systems is not reproduced here, as to do so may obscure the facts of the invention.

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving customers of large insurance companies and the like. In some cases organizations develop and maintain their own telephony operations with purchased or leased equipment, and in many other cases, companies are outsourcing such operations to firms that specialize in such services.

A large technical support operation serves as a good example in this specification of the kind of applications of telephone equipment and functions to which the present invention pertains and applies, and a technical support organization will be used from time to time in the current specification for example purposes. Such a technical support system, as well as other such systems, typically has a country-wide or even world-wide matrix of call centers for serving customer's needs. Such call center operations are more and more a common practice to provide redundancy and decentralization. However, the components of the present specification can apply to a single call center as well.

In a call center, a relatively large number of agents handle telephone communication with callers. Each agent is typically assigned to a telephone connected to a central switch, which is in turn connected to a public-switched telephone network (PSTN), well-known in the art. The central switch may be one of several types, such as Automatic Call Distributor (ACD), Private Branch Exchange (PBX), or PSTN.

An organization having one or more call centers for serving customers typically provides one or more telephone numbers to the public or to their customer base, or both, that may be used to reach the service. The number or numbers may be published on product packaging, in advertisements, in user manuals, in computerized help files, and the like. There are basically two scenarios. If the organization providing the service has a single call center, the number will be to the call center, and all further routing to an agent will be at the call center. If there are several call centers, the organization may provide several numbers, one for each call center, and the customer may be expected to use the number for the closest center, or for the center advertised to provide specifically the service he or she might need. In some cases the number provided will connect the caller with a first Service Control Point (SCP) which is adapted to pre-process incoming calls and forward the calls to other call centers.

Routing of calls, then, may be on several levels. Pre-routing may be done at SCPs and further routing may be, and almost always is, accomplished at individual call centers. As described above, a call center typically involves a central switch, which may be, for example, an Automatic Call Distributor (ACD), Private Branch Exchange (PBX), or a public-switched telephone network (PSTN) switch. The central switch is connected to the PSTN network, well-known in the art. Agents, trained to handle customer service, man telephones connected to the central switch. This arrangement is known in the art as Customer Premises Equipment (CPE).

If the call center consists of just a central switch and connected telephone stations, the routing that can be done is very limited. Switches, such as ACD, PBX, PSTN and the like, although increasingly computerized, are limited in the range of computer processes that may be performed. For this reason additional computer capability in the art has been added for such central switches by connecting computer servers adapted to run control routines and to access databases. The processes of incorporating computer enhancement to telephone switches is known in the art as Computer Telephony Integration (CTI), and the hardware used is referred to as CTI equipment.

In a CTI system telephone stations connected to the central switch may be equipped also with computer terminals, so agents manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center. It is this processor that provides the CTI enhancement for the call center.

When a call arrives at a call center, whether or no the call has been pre-processed at a SCP, typically at least the telephone number of the calling line is made available to the receiving switch at the call center by a telephone carrier. This service is available by most PSTNs as caller-ID information in one of several formats. If the call center is computer-enhanced (CTI) the phone number of the calling party may be used to access additional information from a database at a server on the network that connects the agent workstations. In this manner information pertinent to a call may be provided to an agent.

Even with present levels of CTI there are still problems in operating such call centers, or a system of such call centers. There are waiting queues with which to contend, for example, and long waits may be experienced by some callers, while other agents may be available who could handle callers stuck in queues. Other difficulties accrue, for example, when there are a number of call backs due to missed orders or other problems that must be initiated by agents who are trying to field incoming calls simultaneously. Still other problems accrue due to known latency in conventional equipment. There are many other problems, and it is well recognized in the art, and by the general public who have accessed such call centers, that there is much room for improvement in the entire concept and operation of such call center systems. It is to these problems, pertaining to efficient, effective, timely, and cost-effective service to customers (patrons) and to better management of agents working in call center systems that aspects and embodiments of the present invention detailed below are directed.

Typically, call centers are manned by agents connected by telephone and trained to handle certain problems experienced by customers such as questions regarding complicated installations of software and so on. Another instance might be a large sales network wherein the agent is trained to take customer orders and the like. Generally, agents who are employed to operate in such a call center work on site and must log-in and be counted present so that calls can be routed to that particular agent.

In typical call center operations agents are primarily engaged in handling incoming calls from persons seeking services provided by the call center. This is not, however, the only task agents handle. In many instances there is a need for agents to make outgoing calls. An agent, for example, in interaction with a calling party, may need to research some item of information, then place a call back to the original caller. In other instances the primary function of the call center may be agent-initiated calls (sales, marketing for example). In any case, there are often reasons for agents taking part in calls originated at the call center, in addition to their other duties.

In the operation of call centers wherein calls are placed from the call center, it is known in the art to make such calls by an automatic dialing system, wherein a call answered by a client is then transferred, hopefully quickly, to an available agent.

There are somewhat crude methods known in the art for allocating time for agents to handle both incoming and outgoing calls. For example, some conventional systems establish a rough ratio of incoming to outbound calls by limiting the number of outbound calls agents can make, by limiting the available number of trunk lines available to agents for outbound calls. Very little has been done in the art at the time of the present application, however, to efficiently manage agent's activity in handling outbound calls.

What is clearly needed is a method whereby outbound calls can be made in automated fashion, transparent to the agent, and when connected, can be distributed efficiently among available agents, while providing call data quickly to agents to which outbound calls are connected. Maximum efficiency can be achieved in such a system by blending and distributing the calls among agents in a group or groups of agents based on specific and tightly controlled, tested protocols.

SUMMARY OF THE INVENTION

In a preferred embodiment of the present invention a telephony dialing system for use with a call center is provided, comprising a list of telephone numbers to be dialed; a dialing rate controller; and sensors adapted for monitoring activity of the call center, including call volume, call characteristics, and agent availability. The dialing rate controller sets dialing rate for the dialing system based on one of a maximum allowed overdial probability and a desired agent utilization factor.

In an embodiment based on a maximum allowed overdial probability the dialing rate controller sets the dialing rate based on the maximum allowed overdial probability by expressing overdial probability as a function of number of agents and total traffic volume, setting the probability function equal to the maximum allowable overdial probability, solving the resulting equation for maximum total traffic volume producing the maximum overdial probability, and determining and setting a new dialing rate by dividing the difference between the calculated maximum traffic volume and known inbound traffic volume by the product of average call length and hit rate, where hit rate is the percentage of connected calls to total dialed outbound calls.

In an embodiment based on a desired agent utilization factor the dialing rate controller determines maximum total traffic volume by the product of number of agents and the desired agent utilization factor, and then determining and setting a new dialing rate by dividing the difference between the calculated maximum traffic volume and known inbound traffic volume by the product of average call length and hit rate, where hit rate is the percentage of connected calls to total dialed outbound calls. In both methods the determination and setting of dialing rate is a repeatable and repeated function of the dialing system, recalculation occurring more often than once per second, and in practical systems on the order of milliseconds. Dialing systems according to the embodiments of the invention described are adapted to call centers of various architectures, typically through interfacing with CTI applications.

In the methods of the present invention in various embodiments call blending between inbound and outbound calls is accomplished in a manner maximizing agent utilization and equipment efficiency.

BRIEF DESCRIPTION OF THE DRAWING FIGURES

FIG. 2 is a step listing of a method for call blending according to one embodiment of the present invention.

FIG. 3 is a step listing for a method for call blending according to an alternative embodiment of the present invention.

DESCRIPTION OF THE PREFERRED EMBODIMENTS

Figure 1:
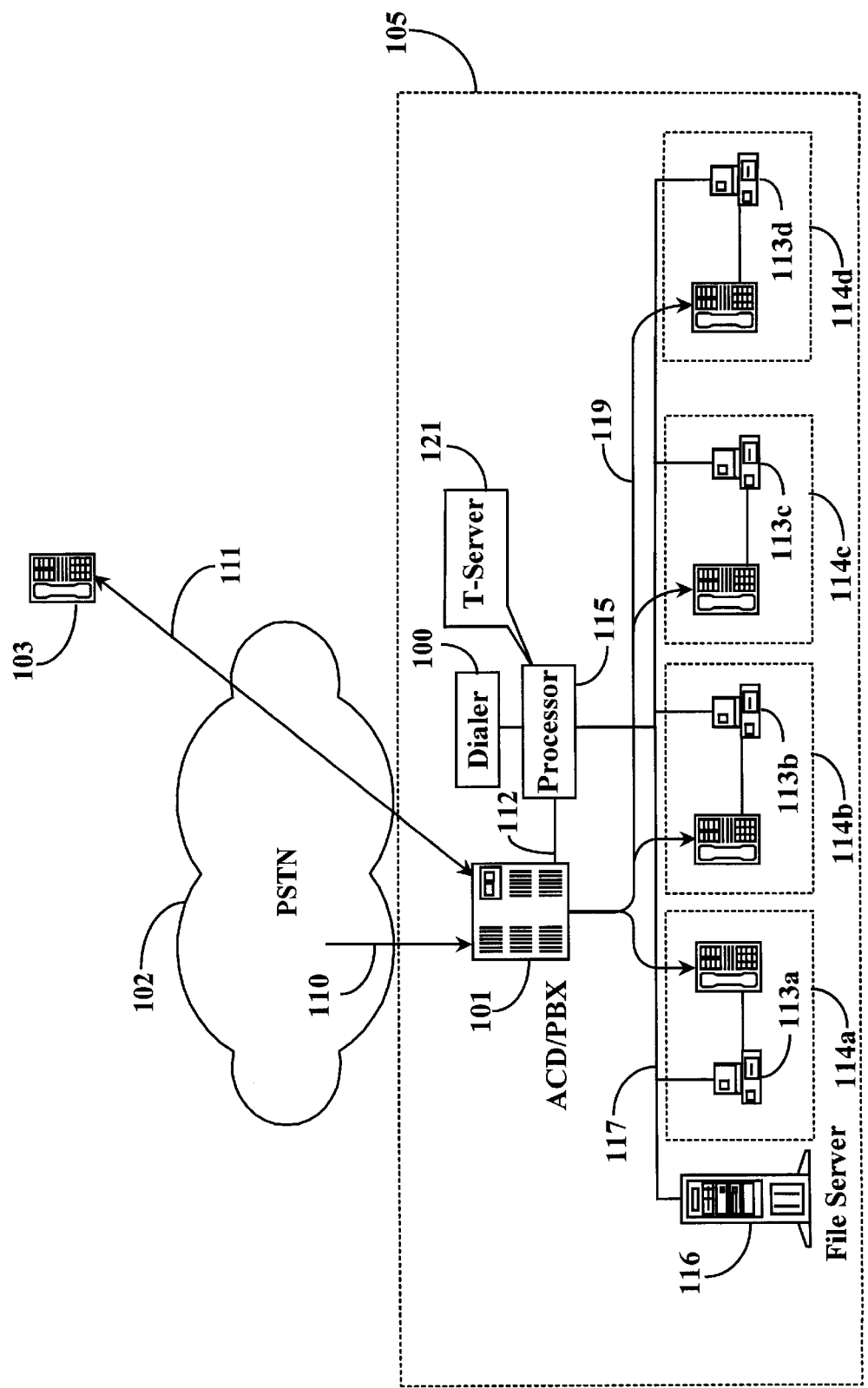
FIG. 1 is a simplified overview of a call center enhanced with call-blending hardware and software according to an embodiment of the present invention.

FIG. 1 is a simplified overview of a call center 105 enhanced with call-blending hardware and software according to an embodiment of the present invention. Central switch 101 may be a PBX or ACD switch as shown in this instant embodiment, or may be any other type of telephony switch known in the art and utilized as a central switch in conjunction with a call center. It will be apparent as well, that the present invention is not limited to a call center architecture just as in the example shown in FIG. 1, but may be applied as well to other arrangements of elements wherein agents may be engaged with clients in handling calls. The methods described below may be applied, for example, over multiple call centers, distributed systems, and the like.

In the exemplary embodiment shown call center 105 (dotted rectangle) includes a series of agent stations 114a through 114d. Agent stations 114a through 114d each have a telephone (113a–113d) connected to switch 105 via lines 119, and also each is equipped with a computer platform having a video display unit (PC/VDU), and each PC/VDU is connected to a local area network (LAN) through LAN connection 117.

Also connected to network connection 117 is a processor 115 executing an instance of a computer-telephony integration (CTI) application 121, known by the inventor as a T-Server. The T-Server executing on processor 115 has several purposes associated with the operation of call center 105. For example, the T-server may exercise control over switching functions and the like in switch 101, and may also monitor events relative to the switch, such as agent availability (phone busy or not busy). A file server 116 also connected to the LAN may be used for various purposes, such as a client data base for example, which may be accessed by the T-Server for sending data to agents as screen-pops and the like.

In this embodiment, processor 115 is connected to an outbound dialer 100 and is integrated or enhanced with call-blending software according to an embodiment of the present invention. The call-blending application forms a control interface with outbound dialer 100 so that functions of the dialer can be altered and controlled. There are a number of ways dialer 100 may be implemented. The dialer may be executed on a separate processor coupled to processor 115 as shown, or the dialer may be integrated with the T-server application executing on processor 115, for example. Processor 115 is connected to switch 101 by a CTI link 112, so outbound calls initiated by dialer 100 may be placed through switch 101 by control of T-server 121.

Referring now back to FIG. 1, agents at agent stations 114a through 114d will from time to time be required to make contact with callers who have perhaps requested additional information that wasn't available at the time of their original call. Perhaps the reason for the required contact resulted from an incorrect shipment, or failure to obtain necessary information with the original call, etc. Conventionally, the agent would have to manually dial the caller and initiate contact. There may be several callers that need to be responded to requiring a significant amount of the agents time as briefly described with reference to the background section. The call-blending software of the present invention, through it's integration with outbound dialer 100, is designed to operate transparently to the agent automatically dialing customer numbers and connecting them to a next available agent in an appropriate and efficient manner.

There are a variety of reasons, as previously stated, why outbound calls may need to be placed. There are similarly a variety of methods by which dialer 100 may receive numbers for calls to be dialed. In one instance, for example, agents at agent stations 114a–114d will have an interface for entering the numbers via PC/VDU and LAN connection to the dialer or a database accessible to the dialer. Regardless of how and why the numbers are entered, and any priority or other requirements for placing such calls are also entered, once these numbers and possible other criteria are entered, outbound dialer 100 can initiate telephone contact with customers such as customer 103 through central switch 101. Out bound dialer 100 can be programmed through it's interface with the call blending software of the present invention to initiate telephone contacts only after a predetermined criteria is met. For example, the criteria may contain a specification for dialing out only when a detected level of incoming calls is below a target number, or at specified time blocks requested by customers (i.e. after 4.00 PM). Callers whose numbers have been sorted by a particular time block could be stored in a separate dial-out queue or list.

In this embodiment, outbound calls are initiated by dialer 100 and placed through switch 101 by control of T-Server 121 executing on processor 115. Once initiated, the actual call is placed to a client such as client 103 over link 111 through PSTN 102. Outbound dialer 100 using techniques well-known in the art can determine whether or not an established connection is with a live person, a message machine, or a fax, and so on. In the event a message machine is called, outbound dialer 100 could hang up and re-queue the number for a later attempt, or perhaps leave a recorded message of the attempted call.

In the event a live person answers the phone, routines in the dialer or coupled to the dialer connect the call immediately typically to the next available agent. Connections established by outbound dialer 100 arrive at agent stations 114a through 114d in much the same fashion as incoming calls accept that a screen pop provided to the agent's PC/VDU identifies the connection as a call back, or provides some other appropriate script.

While there are outbound dialers that are known to the inventor and to those with skill in the art that can dial preprogrammed numbers and establish a phone connection, there are no known outbound dialers that are integrated with or generically linked to a unique call-blending software such as the call-blending software of the present invention. Further, the call-blending software of the present invention provides unique and added functionality to the outbound dialing process. For example, established outbound connections can be distributed efficiently among a group of agents eliminating possible overloading of some agents and underloading of others. With the aid of the call-blending software of the present invention, outbound dialing can be programmed to operate in accordance with a given set of criteria so as to maximize call center efficiency.

In a preferred embodiment of the present invention, preprogrammed criteria used to control the outbound dialing function is allowed to change with the dialing rate changing accordingly and without loosing automation. For example, if the number of incoming calls to the call center becomes greater while the number of working agents in a group stays the same then the outbound dialer function will scale back accordingly by dialing less frequently. As various variables in the equation change, the call-blending software of the present invention will adjust the dialing function accordingly. More detail describing the call-blending software of the present invention in different embodiments is provided in examples to follow.

One measure of the efficiency of outbound dialing is an overdial rate. Overdial rate is the percentage of clients that have been contacted by outbound dialer 100 of FIG. 1 wherein no agent was available to answer the call. In a preferred embodiment of the present invention, the ideal goal is to drive the overdial rate toward zero. FIG. 2 is a step listing for a method of practicing the present invention according to overdial rate. Because a call center will experience wide fluctuation in call volume, and number of agents available at any one time to answer calls, control routines in various embodiments of the present invention must be flexible, therefore values that dictate how outbound dialer 100 of FIG. 1 will respond will preferably be continually recalculated. In particular, because dialer 100 is coupled to processor 115, and processor 115 monitors all activity of switch 101, the dialer can access current values of variables associated with calls, call volume, call duration and the like. Definitions of variables and associated acronyms are listed under Definitions in FIG. 2. In a preferred embodiment Poisson distribution is used to recalculate average call length E(ts), call arrival intensity E(n), inbound traffic $T_{inb}$, hit rate (HR), and the like at very frequent intervals. In practicing the invention, because of rapid (high frequency) operation of computer systems and the relatively short sequence of calculations required to determine dialing rate, the system recalculates at a high frequency, such as in a few milliseconds. In practice, a much slower recalculation, such as on the order of once per second could be used.

A desirable goal in the overdial method of managing outbound calls by dialer 100 would be to minimize overdial rate as much as possible, while at the same time maximizing usage of available agents to connect to answered calls. Management is accomplished by varying the dialing rate (DR), measured in calls dialed per minute, for example. As a practical matter, however, if no calls are made at all (DR=0), the overdial rate will be zero. As the dialing rate increases, the overdial rate will remain near zero until a threshold is reached at which the overdial rate begins to increase significantly. The method is driven, then, by assuming an allowable maximum (low) overdial rate.

In the overdial method some assumptions are made, as briefly mentioned above. One is that calls arrive according to a Poisson arrival pattern with intensity E(n) calls/hour. Another is that the call time length has Poisson distribution with the average of $E(t_s)$. As described above, these values are determined by sampling and calculation according to known Poisson distribution methods, and recalculated each time a new determination of dialing rate is made.

The overdial method can be divided essentially into three steps. In Step 1 it is shown that the probability of having an overdialed call for a group of M agents if M is zero, is 1. The probability of an overdialed call for M>0 is a function of the recursive formula shown in Step 1 of FIG. 2 as a function of traffic volume and the number of agents in the group.

As a second step, the probability function shown in step 1 is set equal to the maximum allowed overdial rate, and the resulting equation is solved for maximum traffic volume, $T_{max}$. As a third and final step, the calculated value for $T_{max}$ from step 2 is used to calculate a new dialing rate according to the formula shown in FIG. 2 as step 3.

Again, because the values of M, T, and so forth change dramatically with time, the dialing rate to achieve the goal has to be recalculated repeatedly, and the values of many of the statistical variables have to be recalculated frequently as well, and this is done in practicing the method, although the frequency of recalculation can vary widely. FIG. 3 is a step listing for a second control method for controlling dialing rate for dialer 100 to achieve efficiency in utilization of agents, according to an embodiment of the present invention. In this method a Busy Factor goal is used. The Busy Factor value is the ratio of the useful time to the total time that an agent has spent in the system. The Busy Factor in this embodiment is synonymous with the term agent utilization. In a preferred embodiment of the present invention the ideal goal for the agent's utilization will be 100 percent. For example, after the agent has logged on to the system, he will ideally be kept busy either answering incoming calls and/or interfacing with outbound calls 100 percent of the time.

Because a call center has many fluctuations in call volume, number of agents available at any one time to answer calls, and in other variables as described above with reference to FIG. 2, the control routines must be. Therefore values that dictate how outbound dialer 100 of FIG. 1 will respond must be continually recalculated using a "sliding window" algorithm, as also described with reference to FIG. 2 above. Definitions and their associated acronyms are listed under Definitions in the embodiment of FIG. 3.

It is assumed here as described above with reference to FIG. 2, that calls arriving into the call center and calls that are being distributed to agents have a Poisson pattern well known in the art. For example, calls arriving have a Poisson arrival pattern with the intensity of E(n) calls/Hour. The length of the call has a Poisson distribution with the average of $E(t_s)$. These values are recalculated frequently based on empirical monitoring of call center characteristics.

Referring now to FIG. 3, in Step 1, the value of the maximum volume of traffic $T_{max}$ that a group of agents can handle for a given number of agents and the required agent utilization is calculated according to the formula shown, as the number of agents in the group times a required agent utilization factor. The next step is similar to the first method described above; that is, the required dialing rate is determined for dialer 100 as a function of the calculated value of $T_{max}$.

In the embodiment of FIG. 3, steps 1 and 2 are continuously repeated during the call-blending process for reasons similar to the embodiment of FIG. 1, along with statistical values for variables required in the calculations.

It will be apparent to one with skill in the art that the call-blending methods of the present invention may be utilized in various outbound calling schemes without departing from the spirit and scope of the present invention. For example, the call-blending software could be utilized to make cold-calls to customers and distribute connected customers to next available sales agents. In another embodiment, outbound numbers could be sorted by different criteria and entered in outbound calling lists wherein the outbound dialer would dial the numbers according to the established protocol. For example, calling certain lists of numbers within a certain applied time window may be programmed into the call-blending software and interfaced with the outbound dialer and so on.

As an automated software application, the call-blending software of the present invention could be programmed to stop when a predetermined level of inbound traffic is detected, or at certain times of the day when there may be fewer agents available to answer the calls, such as at lunch time or around closing time. It will be apparent to one with skill in the art that a vast number of varied configurations are possible within the spirit and scope of the invention.

It will further be apparent to those with skill in the art that the call-blending software could be tailored and utilized for different groups operating within the same call-center and connected to the same customer information system (CIS) without departing from the spirit and scope of the present invention. For example, one group of agents may be responsible for customer-requested call backs whereas another group of agents may be engaged in handling cold calls, etc. In this embodiment addressing techniques well known in the art could be employed to route the outbound calls to the appropriate group of agents charged with the responsibility for those particular outbound calls. There are many other embodiments that are possible, many of which have already been described. The spirit and scope of the present invention is limited only by the claims that follow.

What is claimed is:

1. A telephony dialing system for use with a call center, comprising:

a list of telephone numbers to be dialed;

a dialing rate controller; and sensors adapted for monitoring activity of the call center, including call volume, call characteristics, and agent availability;

wherein the dialing rate controller sets dialing rate for the dialing system based on one of a desired agent utilization factor and a maximum allowed overdial probability by expressing overdial probability as a function of number of agents and total traffic volume, setting the probability function equal to the maximum allowable overdial probability, solving the resulting equation for maximum total traffic volume producing the maximum overdial probability, and determining and setting a new dialing rate by dividing the difference between the calculated maximum traffic volume and known inbound traffic volume by the product of average call length and hit rate, where hit rate is the percentage of connected calls to total dialed outbound calls.

2. The telephony dialing system of claim 1 wherein the determination and setting of dialing rate is a repeatable and repeated function of the dialing system, recalculation occurring more often than once per second.

3. The telephony dialing system of claim 1 wherein the dialing rate controller sets the dialing rate based on a desired agent utilization factor, determining maximum total traffic volume by the product of number of agents and the desired agent utilization factor, and then determining and setting a new dialing rate by dividing the difference between the calculated maximum traffic volume and known inbound traffic volume by the product of average call length and hit rate, where hit rate is the percentage of connected calls to total dialed outbound calls.

4. The telephony dialing system of claim 1 wherein the determination and setting of dialing rate is a repeatable and repeated function of the dialing system, recalculation occurring more often than once per second.

5. A telephony dialing system for use with a call center, comprising:
   a list of telephone numbers to be dialed:
   a dialing rate controller; and
   sensors adapted for monitoring activity of the call center, including call volume, call characteristics, and agent availability;
   wherein the dialing rate controller sets dialing rate for the dialing system based on one of a maximum allowed overdial probability and a desired agent utilization factor by determining maximum total traffic volume by the product of number of agents and the desired agent utilization factor, and then determining and setting a new dialing rate by dividing the difference between the calculated maximum traffic volume and known inbound traffic volume by the product of average call length and hit rate, where hit rate is the percentage of connected calls to total dialed outbound calls.

6. The telephony dialing system of claim 5 wherein the dialing rate controller sets the dialing rate based on a maximum allowed overdial probability by expressing overdial probability as a function of number of agents and total traffic volume, setting the probability function equal to the maximum allowable overdial probability, solving the resulting equation for maximum total traffic volume producing the maximum overdial probability, and determining and setting a new dialing rate by dividing the difference between the calculated maximum traffic volume and known inbound traffic volume by the product of average call length and hit rate, where hit rate is the percentage of connected calls to total dialed outbound calls.

7. A call center adapted for automatically accomplishing outbound calls, comprising:
   a telephony switch connected to a trunk and to a plurality of telephones at agent stations; and
   an automated telephony dialing system having a list of telephone numbers to be dialed, a dialing rate controller, and sensors adapted for monitoring activity of the call center, including call volume, call characteristics, and agent availability;
   wherein the dialing rate controller sets dialing rate for the dialing system based on one of a desired agent utilization factor and a maximum allowed overdial probability by expressing overdial probability as a function of number of agents and total traffic volume, setting the probability function equal to the maximum allowable overdial probability, solving the resulting equation for maximum total traffic volume producing the maximum overdial probability, and determining and setting a new dialing rate by dividing the difference between the calculated maximum traffic volume and known inbound traffic volume by the product of average call length and hit rate, where hit rate is the percentage of connected calls to total dialed outbound calls.

8. The telephony dialing system of claim 7 wherein the determination and setting of dialing rate is a repeatable and repeated function of the dialing system, recalculation occurring more often than once per second.

9. The telephony dialing system of claim 7 wherein the dialing rate controller sets the dialing rate based on a desired agent utilization factor, determining maximum total traffic volume by the product of number of agents and the desired agent utilization factor, and then determining and setting a new dialing rate by dividing the difference between the calculated maximum traffic volume and known inbound traffic volume by the product of average call length and hit rate, where hit rate is the percentage of connected calls to total dialed outbound calls.

10. A call center adapted for automatically accomplishing outbound calls, comprising:
    a telephony switch connected to a trunk and to a plurality of telephones at agent stations; and
    an automated telephony dialing system having a list of telephone numbers to be dialed, a dialing rate controller, and sensors adapted for monitoring activity of the call center, including call volume, call characteristics, and agent availability;
    wherein the dialing rate controller sets dialing rate for the dialing system based on one of a maximum allowed overdial probability and a desired agent utilization factor, determining maximum total traffic volume by the product of number of agents and the desired agent utilization factor, and then determining and setting a new dialing rate by dividing the difference between the calculated maximum traffic volume and known inbound traffic volume by the product of average call length and hit rate, where hit rate is the percentage of connected calls to total dialed outbound calls.

11. The call center of claim 10 wherein the dialing rate controller sets the dialing rate based on a maximum allowed overdial probability by expressing overdial probability as a function of number of agents and total traffic volume, setting the probability function equal to the maximum allowable overdial probability, solving the resulting equation for maximum total traffic volume producing the maximum overdial probability, and determining and setting a new dialing rate by dividing the difference between the calculated maximum traffic volume and known inbound traffic volume by the product of average call length and hit rate, where hit rate is the percentage of connected calls to total dialed outbound calls.

12. The telephony dialing system of claim 10 wherein the determination and setting of dialing rate is a repeatable and repeated function of the dialing system, recalculation occurring more often than once per second.

13. In a call center operation including an automated call dialer, a method for setting the dialing rate comprising steps of:
    (a) expressing overdial probability as a probability function of number of agents and total traffic volume;
    (b) setting the probability function from step (a) equal to a maximum allowable overdial probability; and (c) solving the resulting equation in step (b) for maximum total traffic volume producing the maximum overdial probability; and (d) determining and setting a new dialing rate by dividing the difference between the calculated maximum traffic volume and known inbound traffic volume by the product of average call length and hit rate, where hit rate is the percentage of connected calls to total dialed outbound calls.

14. In a call center operation including an automated call dialer, a method for setting the dialing rate comprising steps of:

(a) determining maximum total traffic volume by the product of number of agents and a desired agent utilization factor; and (b) determining and setting a new dialing rate by dividing the difference between the calculated maximum traffic volume and known inbound traffic volume by the product of average call length and hit rate, where hit rate is the percentage of connected calls to total dialed outbound calls.

* * * * *